United States Patent [19]
Zeller

[11] Patent Number: 5,550,444
[45] Date of Patent: Aug. 27, 1996

[54] DEVICE AND PROCESS FOR THE REVERSIBLE STORAGE OF ELECTRIC ENERGY BY ITS REVERSIBLE CONVERSION TO KINETIC ENERGY

[75] Inventor: Mathias Zeller, Lengnau, Switzerland

[73] Assignee: Twix Equipment AG, Zurich, Switzerland

[21] Appl. No.: 256,673

[22] PCT Filed: Dec. 7, 1993

[86] PCT No.: PCT/CH93/00274

§ 371 Date: Aug. 23, 1994

§ 102(e) Date: Aug. 23, 1994

[87] PCT Pub. No.: WO94/14219

PCT Pub. Date: Jun. 23, 1994

[30] Foreign Application Priority Data

Dec. 10, 1992 [CH] Switzerland ............ 03784/92

[51] Int. Cl.⁶ ................ H02J 3/30; H02P 6/00
[52] U.S. Cl. ............ 318/139; 318/148; 318/150; 318/805
[58] Field of Search ............ 318/139–158, 318/805, 806; 180/65.8; 363/123, 124, 125, 127, 128, 131, 135, 136

[56] References Cited

U.S. PATENT DOCUMENTS

| | | | |
|---|---|---|---|
| 3,851,232 | 11/1974 | Chirgwin | 318/150 |
| 4,321,478 | 3/1982 | Plunkett et al. | 318/150 X |
| 4,374,347 | 2/1983 | Müller | 318/138 |
| 4,495,451 | 1/1985 | Barnard | 318/150 |
| 4,629,947 | 12/1986 | Hammerslag et al. | 318/161 |
| 4,631,456 | 12/1986 | Drescher et al. | 318/140 |
| 4,735,382 | 4/1988 | Pinson | 318/150 X |
| 4,937,507 | 6/1990 | Masui et al. | 318/141 |
| 5,005,115 | 4/1991 | Schauder | |
| 5,345,154 | 9/1994 | King | 318/139 X |

FOREIGN PATENT DOCUMENTS

| | | |
|---|---|---|
| 0220713 | 5/1987 | European Pat. Off. |
| 3919421 | 12/1989 | Germany |
| 58-097806 | 6/1983 | Japan |

*Primary Examiner*—Brian Sircus
*Attorney, Agent, or Firm*—Cushman Darby & Cushman, L.L.P.

[57] ABSTRACT

In the device, an electric motor is designed as a brushless, electronically commutated pancake motor (201) with permanent magnets arranged on the rotor and coreless windings arranged on the stator. Each winding is provided with a pair of terminals which can be connected in each case via a controllable switch at least to each phase conductor of the alternating power supply and to each other via a further controllable switch.

In a device with pick-ups, the instantaneous voltage between one phase conductor each and a neutral conductor or another phase conductor of the alternating power supply, the instantaneous voltage between the two terminals of at least one pair of terminals, and also the instantaneous current in one winding each are repeatedly sampled. The sampled instantaneous voltages or currents are compared with one another and with corresponding threshold values in order to control the switches in dependence on the instantaneous result of the comparisons.

The device allows a reversible conversion and storage of electric energy from an a.c. power supply into kinetic energy of an electric motor.

14 Claims, 2 Drawing Sheets

DEVICE AND PROCESS FOR THE REVERSIBLE STORAGE OF ELECTRIC ENERGY BY ITS REVERSIBLE CONVERSION TO KINETIC ENERGY

BACKGROUND OF THE INVENTION

1. Field of the Invention

The invention relates to a device for the reversible storage of electric energy by its reversible conversion into kinetic energy in an electric motor, the electric energy being drawn from an a.c. power supply of predetermined frequency and fed back into the a.c. power supply, and also to a process for the operation of this device and to use of a brushless, electronically commutated pancake motor with permanent magnets arranged on the rotor and coreless windings arranged on the stator as an energy store in the abovementioned reversible storage of electric energy.

2. Discussion of the Prior Art

Unless otherwise specified, it is generally to be understood in conjunction with the present invention that the kinetic energy stored in an electric motor may be present both in the mechanical form and in the electrical form or as a combination and sum of these two forms of energy.

The mechanical form of the kinetic energy stored in the electric motor is stored in the rotation of the motor. The electrical form of the kinetic energy stored in the electric motor is stored in the current which flows through those parts of the stator winding which act as an induction coil or choke. It is well-known to a person skilled in the art of mechanics that the rotating rotor stores a mechanical form of kinetic energy dependent on its inertia and its rotational speed, and it is well-known to a person skilled in the art of electrical engineering that a choke or induction coil stores an electrical form of kinetic energy dependent on the current flowing through it (for further explanation it is submitted that, in contrast to this, the electric energy in a capacitor is stored in the form of potential energy, which has the effect that in an LC oscillator the electric energy is exchanged between the potential form and the kinetic form of electric energy). In conjunction with the present invention, the mechanical form and the electrical form of kinetic energy are to be regarded and considered together.

In particular for the uninterrupted feeding of a load from an a.c. power supply, it is known to use as the energy store for the reversible storage of electric energy a d.c. motor which is connected via a supply-side converter to the a.c. power supply and via a load-side converter to the load. In the case of such devices it is always necessary to provide a change-over facility, in order if need be, i.e. depending on the conditions prevailing at the a.c. power supply and at the load, to connect the load to the a.c. power supply or to the load-side converter, or to change it over. In this context it is also known to correct shortcomings of the a.c. power supply, such as deviations or distortions of voltage, waveform, frequency, phase etc., and reactions of the load on the a.c. power supply by electric energy, which is taken from the d.c. motor and fed via the supply-side converter and/or the load-side converter into the a.c. power supply or into the load, respectively.

There are, however, some cases in which this known technique cannot be used at all, or only to a restricted extent or with reservations, in particular for reasons of cost and/or for reasons of space. Such cases are to be encountered in drive technology, if very fast starting times and braking times (the latter for example for accurate positioning) are required, such as in lifts, conveyor belts, electric motor cars, robots etc.

SUMMARY OF THE INVENTION

Therefore it is an object of the invention to propose in the case of a device for the reversible storage of electric energy a solution which is more favourable than hitherto with respect to costs and space requirement.

To achieve this object, a device for the reversible storage of electric energy of the type mentioned at the beginning is characterized by the combination of features specified in claim 1. A process for the operation of this device is characterized by the combination of process steps specified in claim 7. Advantageous further developments of the device and of the process are defined in the dependent claims.

In conjunction with the invention it is to be understood that the sampling of the various voltages and currents takes place with a repetition frequency which is substantially greater than the frequency of the a.c. power supply, in the case of an a.c. power supply of 50 Hz (for example in the case of industrial current) or 400 Hz (for example in the case of aircraft) typically between 20 kHz and 100 kHz. Although frequency values below 20 kHz can also be used, they may be below the upper audible limit of the human ear, which can have unpleasant consequences. Frequency values above 100 kHz can also be used as well, but the technical problems in realising the circuits become more and more difficult to solve with increasing frequency values.

Also within the scope of this invention is the use of a brushless, electronically commutated pancake motor with permanent magnets arranged on the rotor and coreless windings arranged on the stator as an energy store in the reversible storage of electric energy by its reversible conversion into kinetic energy in a pancake motor, the electric energy being drawn from an a.c. power supply of predetermined frequency and fed back into the a.c. power supply. A brushless, electronically commutated pancake motor is known per se, for example from the article by M. Salami in Antriebstechnik 30/8 (1991), and is commercially available. In connection with the permanent magnets arranged on the rotor of the pancake motor and the coreless windings arranged on the stator of the pancake motor, reference is also made to patent documents U.S. Pat. No. 4,187,441, JP-61-185050, JP-01-253211, DE-2143752 and/or DE-2345150.

By the invention it is possible in the case of drive units for hybrid electric motor cars to form a very efficient and compact drive unit with the device according to the invention, a storage battery, capacitors and a combustion engine, which with existing technology results in a vehicle which is too heavy.

It is also possible by the invention to start up jammed conveyor belts and the like with a brief very strong output, in particular if the jamming is attributable to friction when at a standstill.

Moreover, by the invention it is possible in the event of a power failure still to move a lift and the like to the next floor or to the lowermost floor.

In addition, by coupling the energy store designed as an electric motor to a mechanical drive, the invention allows, for example, small heating systems for blocks of houses to be provided with the possibility, at affordable costs, of acting as small power stations and consequently serving in the event of power failure as an emergency emergency power generating set. Thus, as well as emergency power generating sets, small power stations driven by wind or water are made smaller and more efficient, in particular the emergency power generating sets can also be used as waveform modifiers and for phase correction for the a.c. power supply.

The essence of the invention is the direct and reversible conversion between kinetic energy stored in an electric motor and electric energy of any desired voltage or frequency. In principle, the winding of the electric motor is used directly as a storage choke, so that it becomes possible in a double conversion (i.e. carried out one way and back the other way) to convert alternating current directly into alternating current without the diversion via direct current and converters. This results in a significant saving in costs and weight.

In addition, the winding of the electric motor can bear brief overloads or supply overcurrents which the converters would not bear. Therefore, the electric motor need not be designed for high peak output values, but essentially only for their average values with a much lower ratio of peak output to output in continuous operation than in the case of the previously used systems with electric motors and converters. This results in a further significant saving in costs and weight.

The kinetic energy stored in the rotor of the electric motor increases in proportion to the square of the rotational speed of the rotor, so that the use according to the invention of a brushless, electronically commutated pancake motor with permanent magnets arranged on the rotor and coreless windings arranged on the stator results in a significant saving in costs and weight for the same output. Such a pancake motor is namely capable of running at very high rotational speeds, and its control is facilitated by its rotor having a low weight and a low inertia and therefore responding to the supply or removal of electric energy with great differences in rotational speed.

The device according to the invention and its method of operation can be optimized for various operating modes, for example for constant speed or constant torque or greatest-possible torque at the motor shaft, best-possible quality or least-possible reactions on the a.c. power supply (with respect to deviations or distortions of voltage, waveform, frequency, phase etc.), greatest-possible output, greatest-possible efficiency, etc.

In the case of phase-shifting operation, the device according to the invention and its method of operation are of interest in particular in connection with the use of superconductors, since the majority of all losses occurring in the pancake motor occur in the ohmic resistance of the coreless windings arranged on the stator. This heat loss must be dissipated, which at the low temperatures of the superconductors is generally very complex, but in the case of a pancake motor with coreless windings arranged on the stator is far less complex than in the case of the conventional electric motors.

In an operating mode for achieving the greatest-possible output, it is endeavoured to convert as much energy as possible reversibly between the electrical form and the kinetic form. This corresponds to a malfunction and/or emergency operation, which tends to be a rare occurrence and is generally followed by a lengthy cooling phase. For example, it concerns situations where a lift becomes stuck due to overloading and it is required to continue its movement to the next floor, or situations in which, after being at a standstill for a long time, a conveyor belt is stuck by adhesive, resin or hardening of the rubber parts and has to be brought into motion with a jerk, or else situations where, in the case of a wind power station, a gust continues until it has the effect of correspondingly altering the direction or the angle of pitch of the rotor. Here, the output is limited by the maximum permissible values: maximum permissible current in the power supply and in the devices for the electronic commutation of the pancake motor, maximum permissible temperature of the windings in the stator of the pancake motor. Accepted here are the distortions of phase and waveform (such as current peaks) occurring on account of the reactions on the a.c. power supply, and also interfering radiations, these interferences generally not being greater than those which are caused by storms, arcing, switching on or switching off of heavy-duty equipment, earth faults and the like and ought in principle to be withstood by the power supply.

In an operating mode for achieving the greatest-possible braking effect, it is endeavoured to consume as much kinetic energy as possible by converting it into the electrical form or into heat. The latter is clearly a case of emergency operation. In this operating mode, the pancake motor is normally transformed into a generator, and the electric energy thus generated is fed back into the a.c. power supply. If so desired, the generated electric energy may be fed via current conductors of an auxiliary power supply into a battery or be converted into heat in a resistor. If, however, the fault is a power supply failure, it is not possible to feed the generated electric energy back into the a.c. power supply, since on the one hand the power supply voltage drops to zero and consequently the power supply does not consume any output, on the other hand this feeding back is generally prohibited by regulations. In such a special case, in which the return of energy is not possible, the controlling of the switches may be performed in such a way that conditions which are as unfavourable as possible with regard to efficiency are created. For example, it can be arranged that one winding of the rotor generates a current which is fed with "reversed" polarity to another winding, in order to counteract the rotating field in the pancake motor, i.e. one winding brakes and the other winding drives, which in a normal case would be senseless. The kinetic energy is then lost as heat in the dissipative resistances of the windings of the pancake motor and in the switches (semiconductor switching elements such as IGBTs). Of course, the elements thus heated require a corresponding cooling break until their operation may be resumed. For example, such special cases are situations where the current fails when a lift is moving and the invention make it possible nevertheless to continue the movement to the next floor with a braking action, or situations in which a conveyor belt must be stopped gently or abruptly in the event of a power failure, or it is required that an electric motor car is still capable of braking after the battery fuse has blown or the main switch has been switched off, the emergency feeding of the antiblocking system maintaining its effectiveness, or else situations where in the case of a wind power station the occurrence of a gust requires electric energy to be consumed as heat, in order that the rotor is not accelerated to inadmissibly high speeds. In an operating mode for achieving least-possible reactions on the a.c. power supply (least-possible deviations or distortions of voltage, waveform, frequency, phase, etc.), the controlling of the switches may be performed in such a way that winding parts act as storage chokes in order to consume or supply power surges, which consequently are not consumed or supplied by the a.c. power supply. It is accepted here that energy is lost as heat in the dissipative resistances of the windings of the pancake motor and in the switches (semiconductor switching elements such as IGBTs). In this operating mode, the device according to the invention does not respond as quickly as possible to voltage deviations, the pancake motor behaves as if connected with high impedance to the power supply. Consequently, no high currents occur even in the event of sudden fluctuations of the voltage and/or of the frequency. In isolated operation with a plurality of small power stations combined, the coupling-in of the device according to the invention with the pancake motor acting as a generator is easy to accomplish, the power supply feed line does not need to withstand any overcurrent values and can be designed to correspondingly low requirements. It is accepted here that operation does not take place with the best-possible efficiency; corresponding energy losses and heating occur.

In an operating mode for achieving best-possible quality of the a.c. power supply with respect to deviations or distortions of voltage, waveform, frequency, phase etc., the device according to the invention is "hard"-connected to the a.c. power supply, i.e. every deviation or distortion is counteracted as quickly as possible. If, for example, a consuming unit generates an inductive reactive load, the device according to the invention compensates for the corresponding deviations or distortions within its (naturally limited) capabilities. This compensation results in mechanical deviations or distortions of torque and rotational velocity and generates corresponding forces, which are transferred to the stator of the pancake motor and are to be absorbed by its housing. It is accepted here that commands of a ripple control in the power supply are to be detected and protected against the effect of the device according to the invention, since the device according to the invention would otherwise interpret the commands of the ripple control as interferences and would eliminate them as best possible. If so desired, the electric energy corresponding to the interferences may be buffered by a battery via current conductors of an auxiliary power supply, to be precise in the case of relatively small outputs almost until the rotor of the pancake motor is at a standstill. Of particular interest in this context is the fact that the device according to the invention allows small heating systems for blocks of houses to be provided with the possibility of acting as small power stations and consequently, in the event of a power failure, of serving as an emergency power generating set: if such small power stations are interconnected in sufficient number, an emergency power supply to entire line sections over a certain time also becomes possible. It likewise follows that, due to the reduction of the reactive power in the power supply, the losses in the lines are reduced, which improves the stability of the supply voltage at remote locations with weak feed lines.

Normal operation of the device according to the invention is to be seen in a compromise between the abovementioned, partly conflicting functions and properties.

BRIEF DESCRIPTION OF THE DRAWINGS

Exemplary embodiments of the invention are explained in more detail below with reference to the drawing, in which.

DESCRIPTION OF THE PREFERRED EMBODIMENT(S)

Figure 1:
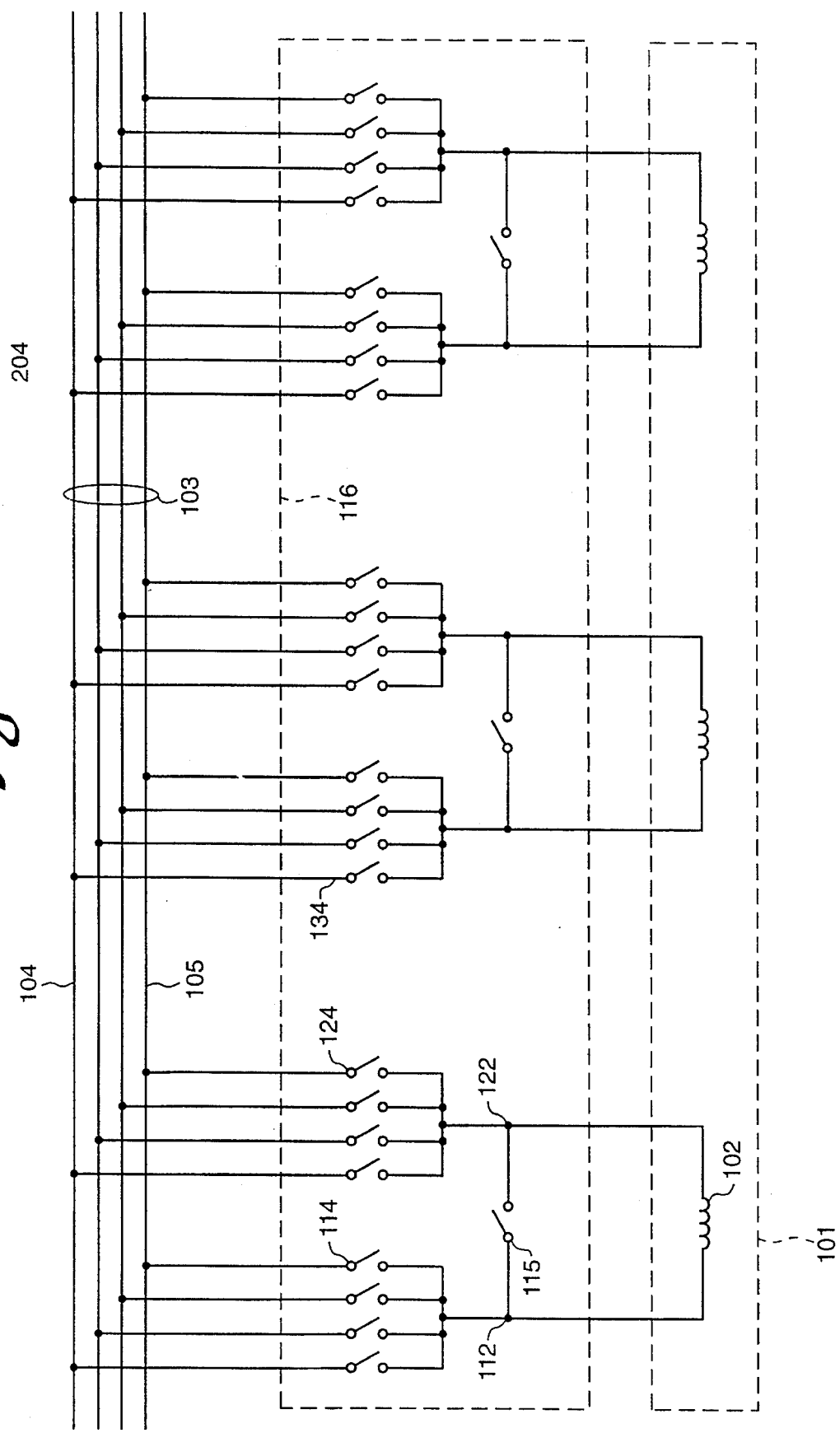
FIG. 1 shows an electrical block diagram of an exemplary embodiment of the device according to the invention.

Referring to FIG. 1, a the block 101 diagrammatically designates a brushless, electronically commutated pancake motor. As already mentioned, such a pancake motor is known per se, as is its configuration with permanent magnets arranged on the rotor and coreless windings arranged on the stator. For this reason, this pancake motor need not be described in any more detail here. In the design according to FIG. 1, this pancake motor 101 is of a three-phase design and is provided with three windings, which are diagrammatically represented and are denoted by 102. The individual windings 102 are each provided with an assigned pair of terminals, which are denoted by 112 and 122.

It is to be understood that the three-phase design of the pancake motor 101 with three phases U, V, W is given as an example, since the pancake motor 101 may be provided with any desired and expedient number of phases.

Continuing to refer to FIG. 1, a three-phase a.c. power supply 103 with a frequency of 50 Hz is diagramatically represented by three phase conductors 104 and a neutral conductor 105.

Here too, it must be understood that the three-phase design of the a.c. power supply with three phases R, S, T and a neutral conductor N at a frequency of 50 Hz is given as an example, since the a.c. power supply may be provided with any desired and expedient number of phases and be operated at any desired and expedient frequency, for example even at 400 Hz.

Moreover, in the case of the exemplary embodiment of the invention described here, there is no relationship between the number of phases of the pancake motor 101 and the number of phases of the a.c. power supply 103.

Each terminal 112 and 122 of each winding 102 can be connected via an assigned controllable switch 114, 124, 134 to each of the phase conductors 104 of the a.c. power supply 103 and also to the neutral conductor 105. Moreover, the two terminals 112 and 122 of each winding 102 can be connected to each other via an additional assigned controllable switch 115.

Figure 2:
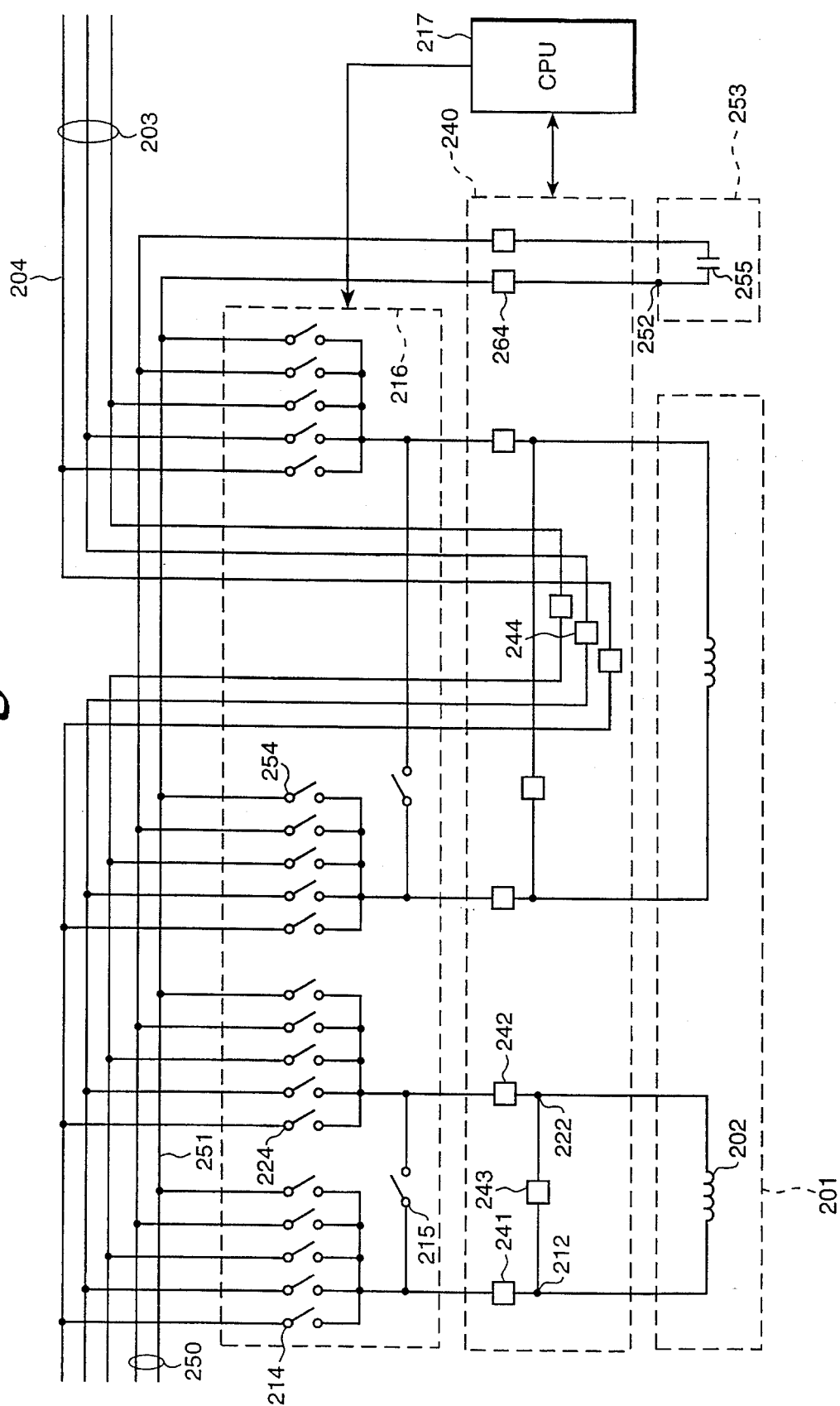
FIG. 2 shows an electrical block diagram of a further exemplary embodiment of the device according to the invention.

Referring to FIG. 2, the block 201 diagrammatically designates therein the brushless, electronically commutated pancake motor. For better illustration of the invention by a different exemplary embodiment, this pancake motor 201 is of a two-phase design here, with two phases U, V, and is provided with two windings, which are diagrammatically represented and are denoted by 202. The individual windings 202 are each provided with an assigned pair of terminals, which are denoted by 212 and 222.

Continuing to refer to FIG. 2, a three-phase a.c. power supply 203 with a frequency of, for example, 50 Hz or 400 Hz is diagrammatically represented by three phase conductors 204 without neutral conductor.

This makes it clear that also in the case of the exemplary embodiment of the invention described here there is no relationship between the number of phases of the pancake motor 201 and the number of phases of the a.c. power supply 203.

Each terminal 212 and 222 of each winding 202 can be connected via an assigned controllable switch 214, 224 to each of the phase conductors 204 of the a.c. power supply 203. Moreover, the two terminals 212 and 222 of each winding 202 can be connected to each other via an additional assigned controllable switch 215. The switches 214, 215, 224 are part of a complete group of switches 216, but they are controlled individually by a device 217 which is substantially composed of a microprocessor or at least comprises a microprocessor.

In a group 240 of measuring devices, pick-ups 241, 242, 243 are provided for the voltage between the two terminals 212, 222 of the respective pairs of terminals and for the current of the respective winding. These pick-ups are driven by the device 217 in such a way that a periodically repeated sampling of the relevant voltages and currents takes place. As already described, the frequency of this sampling is substantially greater than the frequency of the a.c. power supply and, in the case of an a.c. power supply of 50 Hz (for example in the case of industrial current) or 400 Hz (for example in the case of aircraft) typically lies between 20 kHz and 100 kHz.

Likewise provided in the group 240 of measuring devices driven periodically by the device 217 are pick-ups 244 for the voltage at the phase conductors 204 with respect to another phase conductor 204 of the a.c. power supply 203 or, with respect to a neutral conductor (not drawn in).

Apart from the microprocessor mentioned, the device 217 also comprises devices which allow the sampled instantaneous voltages or currents to be compared with one another and/or with corresponding threshold values and allow the switches mentioned to be controlled in dependence on the instantaneous result of these comparisons. Of course it must be understood that these comparing devices and controlling devices or parts thereof may also be formed in the microprocessor and that their function may be executed by the microprocessor.

The switches 114, 115, 124, 134 mentioned in conjunction with FIG. 1 are part of a complete group of switches 116 and are likewise controlled individually by a device of the type described: however, in FIG. 1 this device is not drawn in in order to simplify the representation. Moreover, in the exemplary embodiment represented in FIG. 1 there are likewise provided measuring devices and pick-ups of the same type as in the case of the exemplary embodiment represented in FIG. 2, but in FIG. 1 these measuring devices and pick-ups are also not drawn in in order to simplify the representation.

The major difference between the exemplary embodiments of the invention according to FIGS. 1 and 2 is that, in the exemplary embodiment according to FIG. 2, an auxiliary power supply 250 with current conductors 251 is provided. Each terminal 212 and 222 of each winding 202 can be connected via an assigned controllable switch 254 to each of the current conductors 251 of the auxiliary power supply 250. The switches 251 are also part of the complete group of switches 216, and they too are controlled individually by the already mentioned device 217.

In the exemplary embodiment according to FIG. 2, the auxiliary power supply 250 comprises two current conductors 251, which are each connected to a terminal 252 of a store 253 for electric energy. In the exemplary embodiment according to FIG. 2, this store 253 for electric energy is designed as capacitor 255, so that the two current conductors 251 of the auxiliary power supply 250 are connected to each other in terms of circuitry via this capacitor 255. However, it must be understood that the store 253 for electric energy may also be designed in some other way, for example as a storage battery.

Likewise provided in the group 240 of measuring devices driven periodically by the device 217 are pick-ups 264 for the voltage and, if appropriate, the current at the current conductors 251 of the auxiliary power supply 250 with respect to another phase conductor 251 of the auxiliary power supply 250 or with respect to a neutral conductor (not drawn in) of the auxiliary power supply 250.

To make it easier to maintain an overview during the description which now follows of the process for operation of the device described above, it is pointed out that the device according to the invention is generally operated in such a way that, at appropriate times when the states of the various voltages and currents prevailing at that instant allow, a) energy is drawn from the power supply and stored in the electric motor, or b) energy is drawn from the electric motor and fed into the power supply, or c) no energy flows between the electric motor and the power supply, it being so if appropriate that d) energy is drawn from the electric motor and fed into the energy store connected to the auxiliary power supply, or e) energy is drawn from the energy store connected to the auxiliary power supply and is stored back in the electric motor, or f) no energy flows between the electric motor and the energy store connected to the auxiliary power supply.

For this purpose, the following take place with the already mentioned repetition frequency and by means of the already mentioned measuring devices:

a periodic sampling of the instantaneous voltage at the phase conductors of the a.c. power supply with respect to the neutral conductor or another phase conductor with subsequent determination of the phase conductors of which the instantaneous voltage has the greatest instantaneous positive or negative value in absolute terms;

a periodic sampling of the instantaneous voltage at each winding between the corresponding two terminals with subsequent determination of which terminal of the pair of terminals is positive or negative at that instant; and a periodic sampling of the instantaneous current in each winding with subsequent comparison of the absolute value of this instantaneous current with a threshold value.

The threshold value mentioned above for the current in each winding corresponds substantially to the nominal value which corresponds to the type of the electric motor and is specified by the motor manufacturer. As a departure from this, the threshold value mentioned may also be set to a higher value, for example up to the maximum permissible current which corresponds to the type of the electric motor. Such a high threshold value may be used, for example, whenever the microprocessor is programmed in such a way that it allows the corresponding current to flow only briefly through the windings of the electric motor and an adequate cooling of the electric motor is ensured.

It is to be understood in this case, that, with respect to the periodic sampling of the instantaneous voltage at each winding between the corresponding two terminals, either an actual measurement may be performed, or the relevant voltage values may be calculated by the microprocessor, for example on the basis of data from an absolute shaft-angle encoder for the instantaneous position, rotational speed and rotational acceleration of the rotor in the electric motor and on the basis of input tables of possible values for the state of the electric motor at any one instant. This possibility mentioned second is much less complex than the first, but is nevertheless sufficient for achieving the object of the invention.

On the basis of the results of the samplings, determinations and comparisons specified above, the device described above (device 217 in the case of the exemplary embodiment represented in FIG. 2) is programmed in order to execute the following process steps and make decisions:

If the absolute value of the instantaneous current in a winding becomes less than the threshold value, actuation of the switches for interrupting the existing connections of the two terminals of the corresponding winding and for establishing a connection of the terminal which is positive at that instant to the phase conductor which has the greatest instantaneous positive voltage value in absolute terms, and of the terminal which is negative at that instant to the phase conductor which has the greatest instantaneous negative voltage value in absolute terms; and if the absolute value of the instantaneous current in a winding becomes equal to or greater than the threshold value, actuation of the switches for interrupting existing connections of the two terminals of the corresponding winding and for establishing a connection of these two terminals to corresponding terminals of a device for the conversion of energy stored in the electric motor in kinetic form into another form of energy.

In a first exemplary embodiment of the device mentioned for the conversion of energy stored in the electric motor in kinetic form into another form of energy, this conversion device comprises quite simply the winding and a short-circuit, i.e. the relevant energy conversion is brought about by establishing a connection between the two terminals of the corresponding winding by means of the additional switch described above. As a result, in the electric motor mechanical energy (in conjunction with the rotation of the rotor) is converted into electric energy (in conjunction with the current through the winding), the kinetic form being retained. Although ohmic losses also occur, they do not have substantial effects in the case of the process according to the invention, so that the irreversible conversion of kinetic energy into heat is not significant and is not discussed here in any further detail. The current through the winding then influences the rotation of the rotor of the electric motor, and consequently the current through the other windings of the electric motor, in the way required by the microprocessor, which has an effect on the exchange of energy between the a.c. power supply and the electric motor.

In another exemplary embodiment, a connection between the two terminals of the corresponding winding which is not directly to each other via the additional switch, but via one switch each to one and the same phase conductor of the a.c. power supply leads to precisely the same result. Here too, the conversion device mentioned comprises quite simply the winding and a short-circuit.

In yet another exemplary embodiment, a connection between the two terminals of the corresponding winding not directly to each other or to one and the same conductor of the a.c. power supply, but via one switch each to one phase conductor each of the a.c. power supply leads to an analogous result. As a result, energy is fed back from the electric motor into the a.c. power supply, which indeed represents an exchange of energy between the a.c. power supply and the electric motor. The conversion device mentioned substantially comprises here the winding and the generator, which supplies the electric energy to the a.c. power supply. In this exemplary embodiment, the device described above (device 217 in the case of the exemplary embodiment represented in FIG. 2) is preferably programmed to execute the following process steps and make decisions on the basis of the results of the samplings, determinations and comparisons specified above:

determination of an absolute value of the instantaneous voltage between pairs of phase conductors of the a.c. power supply;

determination of a pair of phase conductors of the a.c. power supply to which a least absolute value of the instantaneous voltage corresponds:

connection of one of the two terminals each to one phase conductor each of the pair thus determined, and this preferably by connection of the terminal which is positive at that instant to the phase conductor which is positive at that instant and of the terminal which is negative at that instant to the phase conductor which is negative at that instant.

In the case of the exemplary embodiment represented in FIG. 2, in which an auxiliary power supply is provided, the device 217 described above is programmed to execute the following process steps and make decisions on the basis of the results of the samplings, determinations and comparisons specified above:

Sampling of the instantaneous voltage between a pair of current conductors of the auxiliary power supply and comparison of an absolute value of this instantaneous voltage with the absolute value of the instantaneous voltage between the two terminals of a winding;

if the absolute value of the instantaneous current in a winding becomes less than the threshold value, and if the absolute value of the instantaneous voltage between the two terminals of the relevant winding becomes equal to or greater than the absolute value of the instantaneous voltage between the two corresponding phase conductors of the a.c. power supply, actuation of the switches for interrupting existing connections of the two terminals of the relevant winding and for establishing a connection of that terminal of the corresponding winding which is positive or negative at that instant to the corresponding positive or negative current conductor of the auxiliary power supply, and if, on the other hand, the absolute value of the instantaneous voltage between the two terminals of the relevant winding becomes less than the absolute value of the instantaneous voltage between the two corresponding phase conductors of the a.c. power supply, actuation of the switches for interrupting existing connections of the two terminals of the relevant winding and for establishing a connection of that terminal of the relevant winding which is positive at that instant to the phase conductor which has the greatest instantaneous positive voltage value in absolute terms, and a connection of that terminal of the relevant winding which is negative at that instant to the phase conductor which has the absolutely greatest instantaneous negative voltage value;

If the absolute value of the instantaneous current in a winding becomes equal to or greater than the threshold value, and if the sampled instantaneous voltage between the two terminals of the relevant winding also becomes less than the sampled instantaneous voltage between the two corresponding current conductors of the auxiliary power supply, actuation of the switches for interrupting the existing connections of the two terminals of the relevant winding and for establishing a connection of that terminal of the relevant winding which is positive or negative at that instant to the corresponding positive or negative current conductor of the auxiliary power supply, and if, on the other hand, the sampled instantaneous voltage between the two terminals of the relevant winding also becomes equal to or greater than the sampled instantaneous voltage between the two corresponding current conductors of the auxiliary power supply, actuation of the switches for interrupting existing connections of the two terminals of the relevant winding and for establishing a connection of these two terminals to the corresponding terminals of the said device for the conversion of energy.

Here, the conversion device substantially comprises the winding and the auxiliary power supply with the store for electric energy which is connected thereto and, as already described, may be a capacitor or a storage battery. In this exemplary embodiment, the device 217 described above is preferably programmed to bring about the energy conversion on the basis of the results of the samplings, determinations and comparisons specified above by establishing a connection of that terminal of the winding which is positive at that instant to that current conductor of the auxiliary power supply which is negative at that instant and of that terminal of the winding which is negative at that instant to that current conductor of the auxiliary power supply which is positive at that instant.

It will be evident to a person skilled in the art of the invention that some modifications to the process steps and also additional process steps and further measures may be provided within the scope of the invention without departing from the teaching of the invention as a result.

If the store for electric energy is a storage battery, it may be expedient to take measures not to overcharge the latter. For example, the charging of the storage battery may be monitored by the pick-ups 264 for voltage and current at the current conductors 251 of the auxiliary power supply 250 and by the microprocessor 217, and the group of switches 216 may be controlled by the microprocessor 217 in such a way that the storage battery is not overcharged. In this context it may be expedient to arrange for the group of switches 216 to be controlled by the microprocessor 217 in such a way that no electric energy is fed into the auxiliary power supply 250 if the absolute value of the instantaneous voltage at the current conductors 251 of the auxiliary power supply 250 becomes greater than a predetermined upper threshold value, and no electric energy is drawn from the auxiliary power supply 250 if the absolute value of the instantaneous voltage at the current conductors 251 of the auxiliary power supply 250 becomes less than a predetermined lower threshold value.

What is claimed is:

1. A device for the reversible storage of electric energy by reversible conversion of the electric energy into kinetic energy in an electric motor, the electric energy being drawn from an a.c. power supply of predetermined frequency and fed back into the a.c. power supply, comprising:

a brushless, electronically commutated pancake electric motor with permanent magnets arranged on a rotor thereof and coreless windings arranged on a stator thereof, each of said windings being provided with a pair of terminals, which are respectively connectable, each via a respective controllable switch, to at least one phase conductor of the a.c. power supply, devices for repeated sampling of an instantaneous voltage at one phase conductor each with respect to a neutral conductor or another phase conductor of the a.c. power supply, devices for repeated sampling of an instantaneous voltage between the terminals of at least one said pair of terminals, devices for repeated sampling of an instantaneous current in each winding, and a device for comparing the sampled instantaneous voltages or currents with one another and with corresponding threshold values and for controlling said switches in dependence on the instantaneous result of the comparisons.

2. A device according to claim 1, wherein:

the terminals of each pair of terminals are directly connectable to each other via a respective controllable switch.

3. A device according to claim 1, wherein:

said device for comparing the sampled instantaneous voltages with one another and with corresponding threshold values and for controlling said switches in dependence on the instantaneous result of the comparisons comprises a microprocessor.

4. A device according to claim 1, further including:

an auxiliary power supply, said terminals being connectable via a controllable switch to at least one current conductor of said auxiliary power supply.

5. A device according to claim 4, further comprising:

a store for electricity, said auxiliary power supply comprising at least two current conductors which are connected to each other via said store for electric energy.

6. A device according to claim 5, wherein:

said store for electric energy is one of a capacitor and a storage battery.

7. A process for the reversible storage of electric energy by reversible conversion comprising:

sampling instantaneous voltage at one phase conductor each of an a.c. power supply with respect to a neutral conductor or another phase conductor of the a.c. power supply and determining which said phase conductor has an instantaneous voltage having a greatest instantaneous positive or negative value in absolute terms;

sampling instantaneous voltage between the two terminals of each pair of terminals of respective windings of a brushless, electronically commutated pancake electric motor with permanent magnets arranged on a rotor thereof and coreless windings arranged on a stator thereof, each of said windings being provided with a pair of terminals which are respectively connectable, each via a respective controllable switch to at least one phase conductor of the a.c. power supply, and determining which terminal of the pair of terminals is positive or negative at that instant;

sampling instantaneous current in each said winding and comparing an absolute value of this instantaneous current with a threshold value;

if the absolute value of the instantaneous current becomes less than the threshold value, actuating respective of said switches for interrupting existing connections of the respective two terminals of the corresponding said pair of terminals and establishing a connection of the respective said terminal which is positive at that instant, to the respective said phase conductor which has the greatest instantaneous positive voltage value in absolute terms, and the respective said terminal which is negative at that instant, to the respective said phase conductor which has the absolutely greatest instantaneous negative voltage value;

if the absolute value of the instantaneous current becomes equal to or greater than the threshold value, respective of said switches for interrupting existing connections of the respective two terminals of the corresponding said pair of terminals and establishing a connection of these two terminals to corresponding terminals of a device, for converting energy stored in said electric motor in kinetic form, into another form of energy;

said sampling taking place with a repetition frequency which is substantially greater than the frequency of the a.c. power supply.

8. A process according to claim 7, wherein:

said energy converting is brought about by connecting the respective two terminals of the corresponding said pair of terminals.

9. A process according to claim 8, wherein:

the respective two terminals are connected via a switch each to one and the same phase conductor of the a.c. power supply.

10. A process according to claim 8, wherein:

the respective two terminals are connected via one switch each to one phase conductor each of said a.c. power supply.

11. A process according to claim 10, further comprising:

determining an absolute value of instantaneous voltage between pairs of phase conductors of said a.c. power supply, determining to which pair of phase conductors of said a.c. power supply at least absolute value of the instantaneous voltage corresponds, and connecting one of each of the two respective terminals to one phase conductor each of the pair of phase conductors thus determined.

12. A process according to claim 11, wherein:

the respective terminal which is positive at a respective instant is connected to the respective said phase conductor which is positive at said instant and the respective terminal which is negative at said instant is connected to the respective said phase conductor which is negative at said instant.

13. A process according to claim 7, further comprising:

sampling instantaneous voltage between a pair of current conductors of an auxiliary power supply and comprising an absolute value of this instantaneous voltage with the absolute value of the instantaneous voltage between the two respective terminals of a respective pair of said terminals;

if the absolute value of the instantaneous current in a respective winding becomes less than the threshold value, and if the absolute value of the instantaneous voltage between the two respective terminals of the respective pair of said terminals becomes equal to or greater than the absolute value of the instantaneous voltage between the two corresponding phase conductors of the a.c. power supply, actuating the respective said switches for interrupting existing connections of the two respective terminals of the corresponding said pair of terminals and for establishing a connection of the respective terminal of the corresponding said pair of terminals which is positive at said instant or negative at said instant to the correspondingly positive or negative current conductor of said auxiliary power supply, and if, on the other hand, the absolute value of the instantaneous voltage between the two respective terminals of the pair of said terminals becomes less than the absolute value of the instantaneous voltage between the two corresponding phase conductors of said a.c. power supply, actuating the respective said switches for interrupting existing connections of the respective two terminals of the corresponding pair of said terminals and establishing a connection of the respective terminal of the corresponding pair of said terminals which is positive at said instant to the respective said phase conductor which has the greatest instantaneous positive voltage value in absolute terms, and connecting the respective said terminal of the corresponding pair of said terminals which is negative at said instant to the respective said phase conductor which has the greatest instantaneous negative voltage value in absolute terms;

upon the instantaneous voltage in a winding becoming equal to or greater than said threshold value, and if the sampled instantaneous voltage between the respective two terminals of a pair of terminals becomes less than the sampled instantaneous voltage between the two corresponding current conductors of said auxiliary power supply, actuating the respective said switches for interrupting existing connections of the respective two terminals of the corresponding pair of said terminals and establishing a connection of the respective said terminal of the corresponding pair of said terminals which is positive or negative at said instant to the corresponding positive or negative current conductor of said auxiliary power supply, and if, on the other hand, the sampled instantaneous voltage between the respective two terminals of a pair of said terminals becomes equal to or greater than the sampled instantaneous voltage between the two corresponding current conductors of said auxiliary power supply, actuating the respective said switches for interrupting existing connections of the respective two terminals of the corresponding pair of said terminals and establishing a connection of these two terminals to the corresponding said terminals of the said motor.

14. A process according to claim 13, wherein:

said conversion comprises:

establishing a connection of the respective said terminal which is positive at said instant to a respective current conductor of said auxiliary power supply which is negative at said instant, and establishing a connection of the respective said terminal which is negative at said instant to the respective current conductor of said auxiliary power supply which is positive at said instant.

* * * * *